US010154471B1

(12) United States Patent
Patwardhan et al.

(10) Patent No.: US 10,154,471 B1
(45) Date of Patent: *Dec. 11, 2018

(54) ASSIGNING A SUBSET OF ACCESS POINTS IN A WIRELESS NETWORK TO A HIGH PRIORITY

(71) Applicant: Aruba Networks, Inc., Sunnyvale, CA (US)

(72) Inventors: Gaurav Patwardhan, Santa Clara, CA (US); Sachin Ganu, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,024

(22) Filed: Apr. 16, 2018

Related U.S. Application Data

(63) Continuation of application No. 15/610,319, filed on May 31, 2017, now Pat. No. 9,974,043.

(51) Int. Cl.
| | | |
|---|---|---|
| *H04W 24/00* | (2009.01) | |
| *H04W 64/00* | (2009.01) | |
| *H04W 16/18* | (2009.01) | |
| *H04M 11/04* | (2006.01) | |
| *H04W 88/08* | (2009.01) | |

(52) U.S. Cl.
CPC ......... *H04W 64/003* (2013.01); *H04W 16/18* (2013.01); *H04W 88/08* (2013.01)

(58) Field of Classification Search
CPC . H04W 64/00; H04W 64/003; H04W 64/006; H04W 16/18; H04W 88/08
USPC ...................................................... 455/456.1
See application file for complete search history.

(56) References Cited

U.S. PATENT DOCUMENTS

| 7,916,708 B2 | 3/2011 | Hart |
| 8,345,599 B2 | 1/2013 | Famolari et al. |
| 8,380,220 B2 * | 2/2013 | Alles ........................ G01S 5/021 370/310.2 |
| 8,994,591 B2 * | 3/2015 | Dupray ................ G01C 21/206 342/457 |
| 9,225,602 B2 | 12/2015 | Mettu et al. |

(Continued)

OTHER PUBLICATIONS

Pulkkinen, T., et al.; "Awesom: Automatic Discrete Partitioning of door Spaces for Wifi Fingerprinting"; Jun. 2012; 19 pages.

*Primary Examiner* — Huy C Ho
(74) *Attorney, Agent, or Firm* — Hewlett Packard Enterprise Patent Department

(57) ABSTRACT

Example method includes: determining, by a network device, a plurality of client devices' locations within a wireless network; assigning the plurality of client devices into a number of clusters; calculating an original cluster centroid location for each cluster of client devices; calculating an average distance between each client device in a particular cluster and the original cluster centroid location for the particular cluster; iteratively adjusting the number of clusters and assignment of the plurality of client devices to determine the number of clusters associated with a low number of cluster and a low average distance from each client device in a respective cluster to a respective cluster centroid location; and assigning a subset of access points in the wireless network to a high priority, each AP in the subset having the closest distance to the respective cluster centroid location corresponding to the determined number of clusters.

20 Claims, 5 Drawing Sheets

(56) References Cited

U.S. PATENT DOCUMENTS

| | | |
|---|---|---|
| 9,326,294 B2 | 4/2016 | Tang |
| 9,578,487 B2 | 2/2017 | Ganu |
| 2012/0170471 A1 | 7/2012 | Brown et al. |
| 2013/0231132 A1* | 9/2013 | Huang .................. G01S 5/02 455/456.1 |
| 2016/0227369 A1 | 8/2016 | Gao et al. |

* cited by examiner

ASSIGNING A SUBSET OF ACCESS POINTS IN A WIRELESS NETWORK TO A HIGH PRIORITY

This application is a Continuation of U.S. patent application Ser. No. 15/610,319 filed on May 31, 2017, the content of which are incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND

When a customer wireless network is deployed, the access points (APs) are normally deployed to cover the entire coverage area. While such deployment provides service to all enterprise clients, day-to-day wireless client behaviors are quite different and have to be handled on the fly. Thus, some APs are associated with a higher priority than other APs due to their client serviceability. The list of these high priority APs keeps changing depending on the time and circumstances. Currently, no method is developed to prioritize APs into different priority layers in order to apply certain properties.

BRIEF DESCRIPTION OF THE DRAWINGS

The following detailed description references the drawings, wherein.

DETAILED DESCRIPTION

Figure 1A:
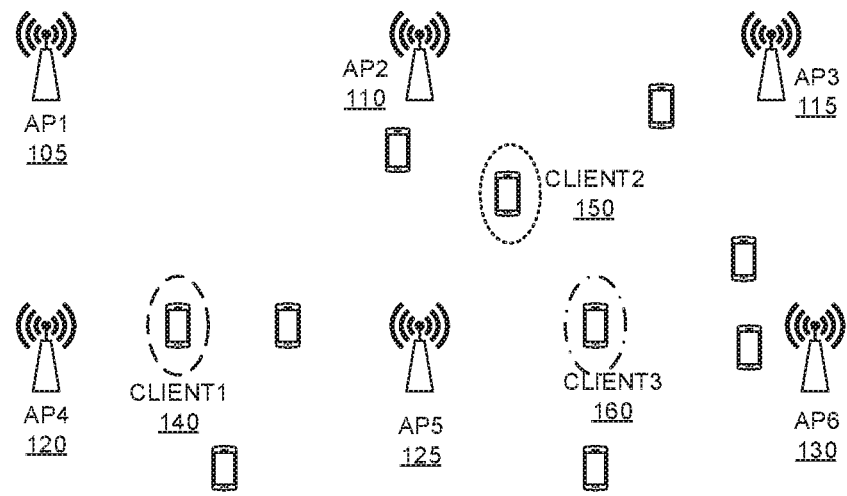
FIGS. 1A-1E are block diagrams of example mechanisms for assigning a subset of access points in a wireless network to a high priority.

Examples described herein include a method and system for assigning a subset of access points in a wireless network to a high priority. In particular, an example network device can determine a plurality of client devices' locations within a wireless network. Then, the network device can assign the plurality of client devices into a number of clusters. Furthermore, the network device can calculate an original cluster centroid location for each cluster of client devices. Then, the network device can also calculate an average distance between each client device in a particular cluster and the original cluster centroid location for the particular cluster. Next, the network device can iteratively adjust the number of clusters and assignment of the plurality of client devices to determine the number of clusters associated with a low number of cluster and a low average distance from each client device in a respective cluster to a respective cluster centroid location. Finally, the network device can assign a subset of access points in the wireless network to a high priority, such that each AP in the subset has the closest distance to the respective cluster centroid location corresponding to the determined number of clusters.

Examples in the present disclosure generally disclose a method to prioritize APs into different layers in order to apply certain properties. This method can be broadly subdivided into two approaches. First, an example system can determine which APs should be selected into the high priority layer. Second, the example system can determine how many APs should be selected into the high priority layer. These determinations are made based on specific context of the network, and can be changing depending on the current state of the network and the wireless client devices.

Note that, when a group of high priority APs is created, the remaining group of APs would form a low priority group. That low priority group of APs can also be used in certain key areas. A few examples of the uses of the high priority APs and low priority APs are given below as an illustration. Many more example scenarios can similarly benefit from the priority layering approach disclosed herein.

In some examples, the network may turn off the radios on the APs belong to the lower priority group in order to reduce the electric usage. During off peak operation hours, a selected subset of high priority APs may be sufficient to provide quality network service. Therefore, turning off the radios on the remaining low priority APs can save power.

In some examples, the radios of the low priority APs may be turned off to preserve the client roaming while achieving coverage balance. If there are very few active APs, then the wireless network may not provide sufficient network coverage for the client devices. On the other hand, if there are too many active APs, the network might suffer from roaming issues. Therefore, the example system can select the right number of APs to be given a high priority, such that the network will not suffer from extensive client roaming and also provides sufficient coverage.

In some examples, the example system can create certain traffic and QoS profiles for APs in the high priority layer. For example, the higher priority layer can be a proxy for the APs residing in places with higher client density. The client density may be similar for day-to-day events. However, the client density might change during special events, e.g., a company-wide town hall meeting, where a large number of client devices are closely located within a single area.

In some examples, certain APs in the higher priority layer can have high priority in selecting channels from a group of feasible channels. Sometimes, a smart phone device may not support certain wireless channels, which happen to be the operating channel of a nearby AP. As a result, the smart phone device would be connected to a faraway AP, which reduces the throughput for other client device connected to the faraway AP. With the solution described herein, the nearby AP would be given a high priority. Therefore, the nearby AP can select a wireless channel that associated client devices (e.g., the smart phone device) support.

Currently, the information that can be used to determine an AP's priority is local to each AP. At most, current systems can try to determine a set of neighboring APs and using additional information obtained from the neighboring APs. However, even with the additional information from the neighboring APs, current systems do not take into consideration locations of client devices.

The example method disclosed herein generally uses client devices as inputs to K-means clustering computation. The k-means clustering computation can produce a center-of-mass location of the client devices' locations. These client devices' locations represent a zone of maximum influence. Generally, the APs in that zone are the ones to be assigned with a high priority. The K-means clustering computation is used here for illustration purposes only. Other appropriate clustering method can also be used. The example method also has the advantage of having centralized information regarding to a client device's location, an AP's location and signal strengths corresponding to the connections between the AP and the client device.

In some examples, the example method can be used in a periodic fashion. In other examples, the example method may be invoked during specific events (e.g., a town hall meeting) when the client devices are concentrated in certain areas which is not seen in day-to-day client behaviors.

FIGS. 1A-1E are block diagrams of example mechanisms for assigning a subset of access points in a wireless network to a high priority. According to examples of the present disclosure, the following information is considered as given. First, each AP's location is known by a co-ordinate system, for example, as shown by X and Y co-ordinates. In FIGS. 1A-1E, a plurality of such APs are shown, including AP1 105, AP2 110, AP3 115, AP4 120, AP5 125, and AP6 130. Second. each client device's location is known by a co-ordinate system as well. For illustration purposes, ten client devices are depicted in FIGS. 1A-1E.

Table 1 below shows a theoretical method assigning a subset of access points in a wireless network to a high priority.

TABLE 1

Begin Method:
m = number of client devices
K = number of cluster centroids or number of APs to assign to a single layer of priority.
L = list of APs.
p% = error applicable in the centroid location (e.g., 5%).
max_STA = maximum number of client devices serviced per AP (e.g., 20).
for loop for number of K from num(L)/max_STA to num(L):
  random initialization for j = 1 to 100 //used for removing local optima issues
    Randomly initialize K cluster centroids mu(1), mu(2), ..., mu(K) such that each represents an STA.
    Repeat until distance between previous and current centroid is less than p%:
      for i = 1 to m:
        c(i) := index (from 1 to K) of cluster centroid closest to x(i)
        //Each client device is assigned to a cluster with the closest centroid.
      for n = 1 to K:
        mu(n) := centroid of points assigned to cluster n //The previous assumption of the centroid location is corrected by the client devices already assigned to the clusters, i.e., a centroid for a cluster is computed.
      mu (n) = {1 | 1 belongs to L and l is closest to mu(n)} // Fit or truncate the centroid to the closest AP.
      Compute avg_distance = sum(dist of each STA with its centroid AP ) / number of client devices.
  Choose the lowest avg_distance amongst all "j" random iterations and store in db (mu, avg_distance, K)
Normalize avg_distance for entries in db
for all entries in db:
  Create a new value per entry called score = normalized_avg_distance * K
Sort using score and get the solution with the lowest score
// lowest score gives the best solution with regard to client distances and the number of APs powered up.
End Method:

At the end of the computation shown in Table 1, the system can determine a number of APs by which maximum client devices are affected. Note that the computation above runs over a single radio frequency domain. As such, it can be scalable, because radio frequency domains in a wireless network deployment are generally within tens to hundreds of APs.

FIGS. 1A-1E shows the computation in Table 1 through a detailed example. The APs and client devices are shown for illustrated purposes only. Any number of APs and client devices can be deployed to utilize the method described herein to determine a subset of high priority APs in the similar fashion.

Referring now to FIG. 1A, in this example, AP1 105 to AP6 130 are deployed in a wireless network, serving ten client devices as depicted. First, the system determines a number K. Specifically, K indicates the number of cluster centroids or the number of APs to assign to a single layer of priority. In the example shown in FIGS. 1A-1E, a K value of 3 is used for illustration purposes. A network administrator can determine the K value dynamically or statically depending on the network's conditions and configurations. With K=3, the system then can select three random client devices as the original cluster centroids. For example, Client1 140, Client2 150 and Client3 160 are selected as the original cluster centroids. All ten client devices in the network will be clustered into one of the three clusters.

Figure 1B:
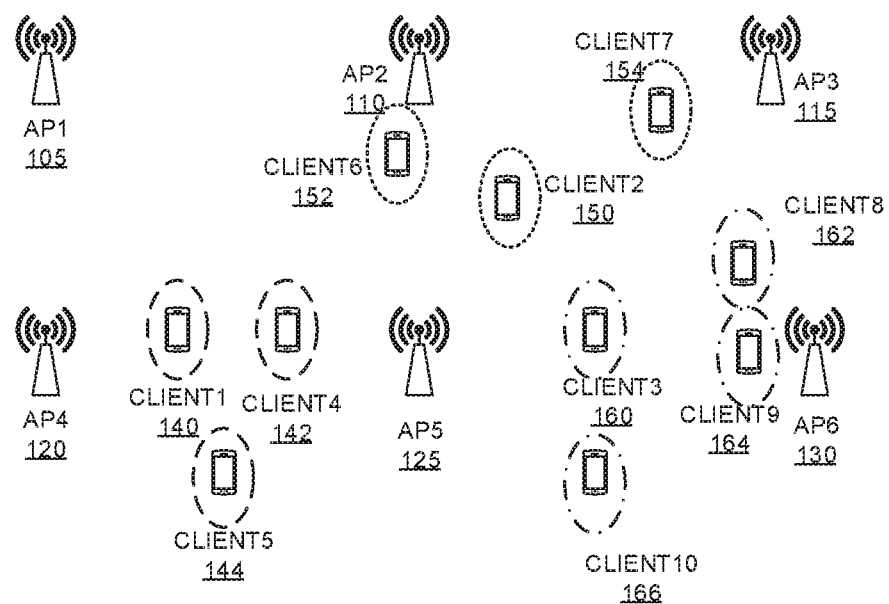
Figure 1C:
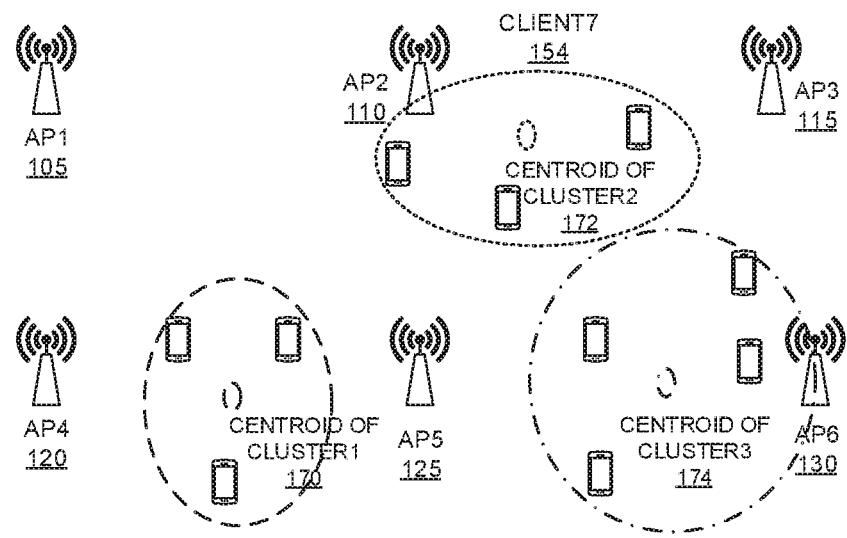

Referring now to FIG. 1B, as a next step, each client device is assigned to a cluster based on the closest centroid. For example, Client 4 142 and Client5 144 are assigned to be in the same cluster with Client 1 140, because Client1 140 is the closest cluster centroid (as compared to Client 2 150 and Client3 160) to Client4 142 and Client5 144. Similarly, Client6 152 and Client7 154 are assigned to be in the same cluster with Client2 150. Also, Client8 162, Client9 164, and Client10 166 are assigned to be in the same cluster with Client3 160.

Referring now to FIG. 10, after all client devices in the network are assigned to a cluster, the system can proceed to compute a centroid for each cluster of client devices. In this example, the cluster of Client1 140, Client4 142 and Client5 144 has centroid of cluster1 170; the cluster of Client2 150, Client7 152 and Client8 154 has a centroid of cluster2 172; and, the cluster of Client3 160, Client8 162, Client9 164, and Client10 166 has a centroid of cluster3 174.

Note that the computed centroid location for each cluster may be different from the original cluster centroid. This is because the original cluster centroid locations are randomly selected to be co-located with K number of random client devices. On the other hand, the computed cluster centroid location corresponds to the middle of each cluster of client devices. As used herein, a cluster centroid generally refers to a vector containing one number for each variable, where each number is the mean of a variable for the observations (e.g., client device location coordinates) in that cluster. The centroid can be used as a measure of the cluster location. For a particular cluster, the average distance from the centroid is the average of the distances between each client device and the centroid. The maximum distance from the centroid is the maximum of the distances between each client device and the centroid.

Figure 1D:
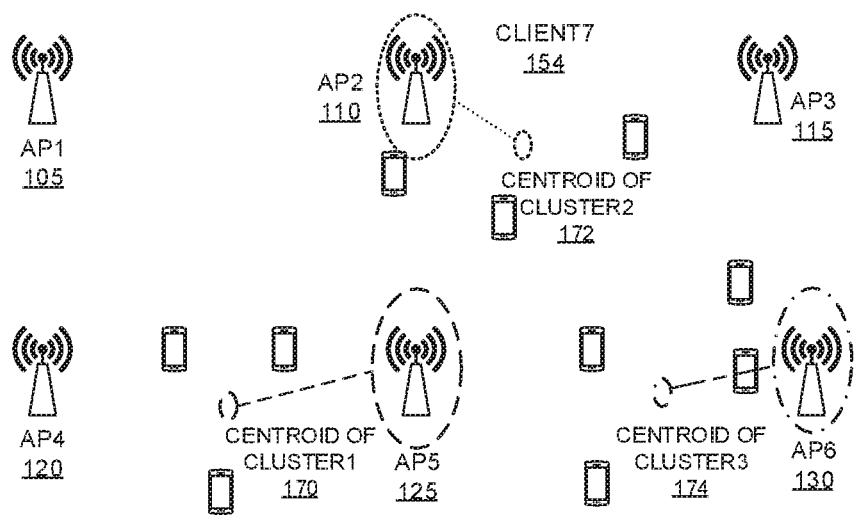

Thereafter, the cluster membership of each client device is computed again based on the distance from each client device's location to a centroid location. This loop of membership computation followed by new centroid location computation is carried on until the previous and the current computation's distance differs by less than or equal to a threshold percentage (p %). At this stage, the computed centroids are shown in FIG. 1D as centroid of cluster1 170, centroid of cluster2 172, and centroid of cluster3 174. Next, the locations of the virtual centroids (e.g., centroid of cluster1 170, centroid of cluster2 172, and centroid of cluster3 174) are truncated to a real AP, such that the closest AP to each centroid is marked as associated with the centroid. In FIG. 1D, AP5 125 is the closest AP to centroid of cluster1 170, and thus is marked as associated with centroid of cluster2 172. AP2 110 is the closest AP to centroid of cluster2 172, and thus is marked as associated with centroid of cluster2 172. Moreover, AP6 130 is the closest AP to centroid of cluster3 174, and thus is marked as associated with centroid of cluster3 174.

Figure 1E:
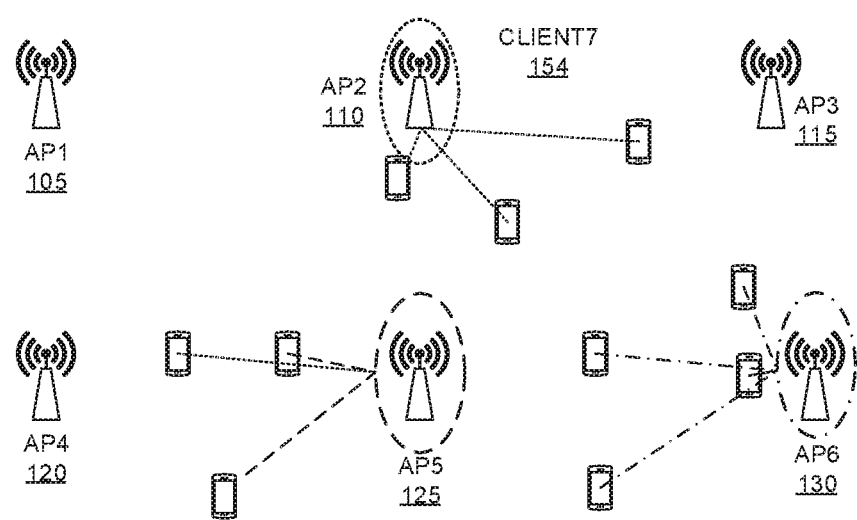

Next, the metric of average distance per client device to the corresponding centroid is computed as shown FIG. 1E. There are three APs in FIG. 1E, each of which corresponds to a respective client device cluster. For AP5 125, the average of distance between the three closest client devices in the cluster and AP5 125 is computed. Similarly, for AP2 110, the average of distance between the three closest client devices in the cluster and AP2 110 is computed. For AP6 130, the average of distance between the four closest client devices in the cluster and AP6 130 is computed.

At this stage, the system has computed a set of the followings:

(1) distance metric from each client device in a cluster to the closest AP;

(2) K value indicating the number of cluster centroid; and (3) AP assignment to each client device cluster.

Thus, the system can randomly select K number of client devices for a predetermined number of times (e.g., 100 times). Then, the system can run the above processes. At the end of 100 times of computation, the system can compare the metric for all iterations (e.g., the 100 iterations) and determine the best metric solution as characterized by the lowest distance metric. Further, the system can store such information (e.g., best distance metric and K value as well as corresponding AP assignments) in a database.

Next, the system can change the value of K according to the outermost "for" loop in the method shown in Table 1 above and repeat the above process again. After looping through different K values, the system can identify the best AP selections and assignments for each of the K values.

One objective of the disclosed solution is to see which APs provide the maximum impact for the client devices in a wireless network. Therefore, two controversial factors are to be balanced. One of the controversial factors is to reduce the number of high priority APs. The other of the controversial factors is to minimize the average distance between each client device in a cluster and the assigned AP for that cluster of client devices. As such, the information stored in the database is normalized and sorted after all the loops are completed.

After sorting the database records, the system can get a gradation of solutions, where the best K versus minimum normalized distance solution may be sorted at the top. The best solution signifies the K APs, which affect the client devices the most. Thus, these K APs can be assigned with high priority (or classified into a high priority layer of APs), and considered for certain enhancements. For example, traffic and/or QoS profiles may be created for APs in the high priority layer; APs in the high priority layer may have priority in selecting its operating channels from a group of feasible channels; etc.

In addition, power save enhancement, other traffic related weights for client devices, or client health parameters can be added in addition to or in lieu of the average distance as the metric in the example method disclosed above.

Figure 2:
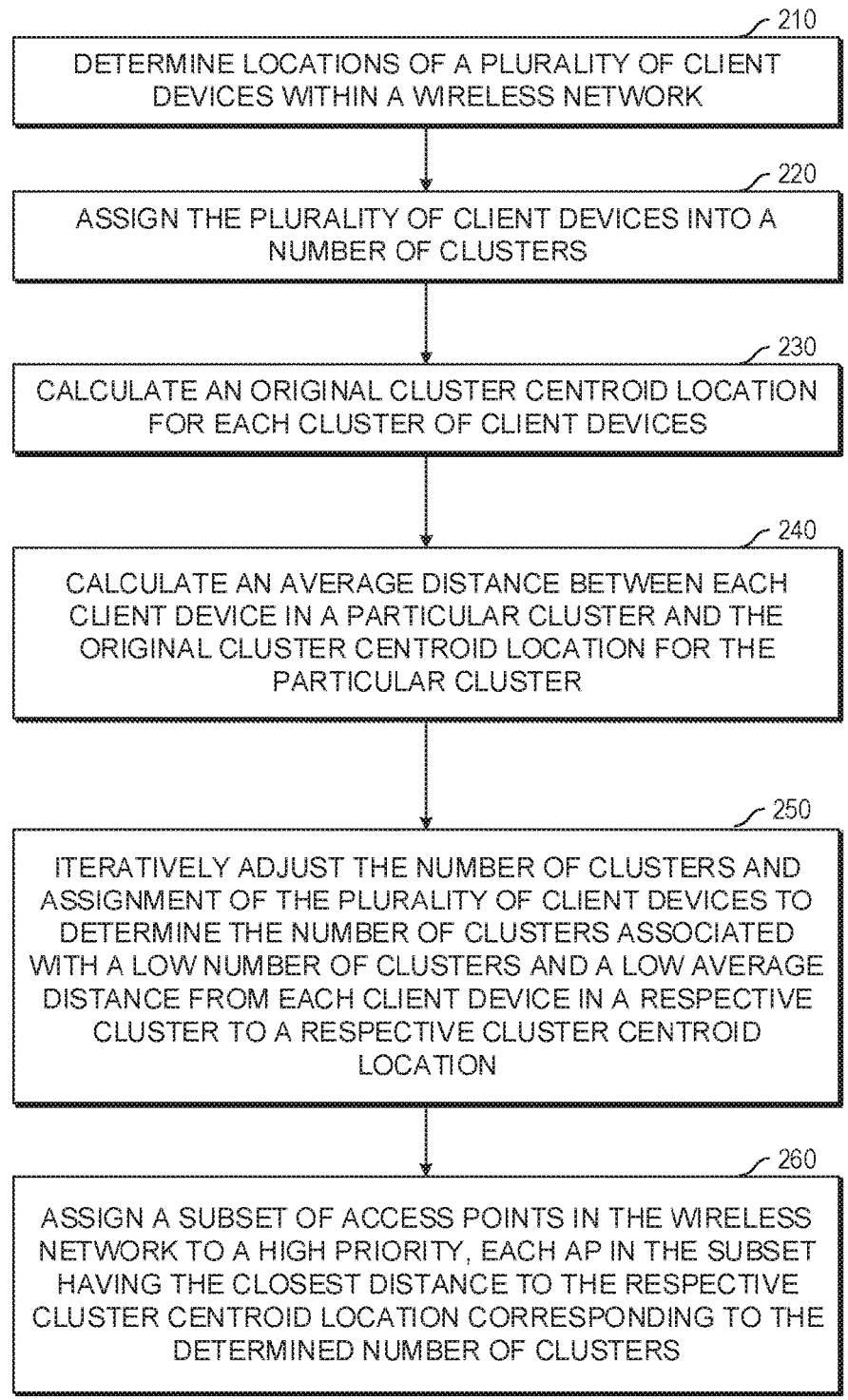
FIG. 2 is a flowchart of an example process of assigning a subset of access points in a wireless network to a high priority.

Processes of Assigning a Subset of Access Points in a Wireless Network to a High Priority FIG. 2 is a flowchart of an example method (e.g., process) of assigning a subset of access points in a wireless network to a high priority. During operations, a network device (e.g., a server or network controller) can determine a plurality of client devices' locations within a wireless network (operation 210). Then, the network device can assign the plurality of client devices into a number of clusters (operation 220). Next, the network device can calculate an original cluster centroid location for each cluster of client devices (operation 230). Further, the network device can calculate an average distance between each client device in a particular cluster and the original cluster centroid location for the particular cluster (operation 240). Also, the network device can iteratively adjust the number of clusters and assignment of the plurality of client devices to determine the number of clusters associated with a low number of cluster and a low average distance from each client device in a respective cluster to a respective cluster centroid location (operation 250). Moreover, the network device can assign a subset of access points in the wireless network to a high priority, whereas each AP in the subset has the closest distance to the respective cluster centroid location corresponding to the determined number of clusters (operation 260).

In some examples, the network device can further assign each client device in the plurality of client devices to a cluster whose cluster centroid location is closest to the location of the each client device.

In some examples, the network device iteratively adjusts the number of clusters and the assignment of the plurality of client devices using K-means clustering. The K-means clustering may aim to partition N observations into K clusters, in which each observation belongs to the cluster with the nearest mean, serving as a prototype of the cluster.

In some examples, while assigning the plurality of client devices into the number of clusters, the network device can randomly select a subset of client devices from the plurality of client devices, wherein a total number of selected client devices equals to the number of clusters; associate each of remaining client devices to one client device in the subset that is closest in distance to each respective remaining client device; and for each client device in the selected subset, identify associated remaining client devices as belonging to the same cluster of client devices.

In some examples, the network device can further give each client device in the plurality of client devices a weight value based on a client parameter. If a respective client device has a high weight value, the network device can select the respective client device frequently into the subset of client devices.

In some examples, the network device can determine a closest cluster centroid location for each of the plurality of client devices; associate each respective client device to a new cluster whose centroid location has closest distance to the each respective client device; and calculate a new cluster centroid location based on client devices associated to the new cluster.

In some examples, the network device further can determine whether a distance between a respective new cluster centroid location and original cluster centroid location is less than a predetermined threshold. If a distance between a respective new cluster centroid location and original cluster centroid location is less than a predetermined threshold, the network device can assign the high priority to the subset of access points having closest distance to each new cluster centroid location.

In some examples, the subset of access points may be (1) associated with a high priority traffic profile, (2) associated with a high priority Quality-of-Service (QoS) profile, and (3) given priority for selecting their operating channels.

Network Device to Assign a Subset of Access Points in a Wireless Network to a High Priority As used herein, a network device may be implemented, at least in part, by a combination of hardware and programming. For example, the hardware may comprise at least one processor (e.g., processor 310) and the programming may comprise instructions, executable by the processor(s), stored on at least one machine-readable storage medium (e.g., 320). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

Figure 3:
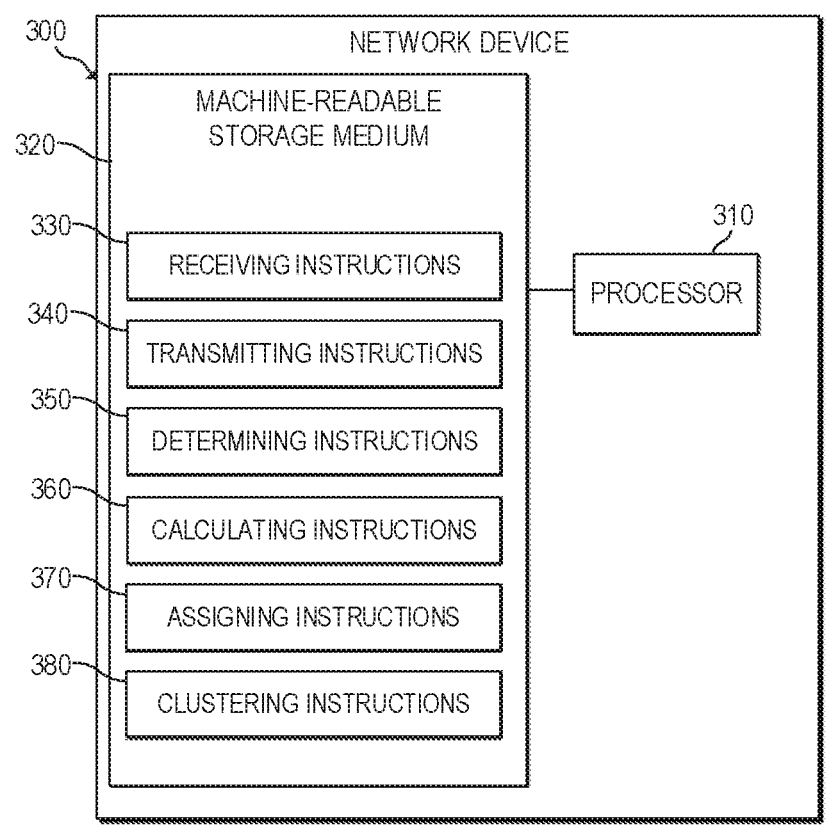
FIG. 3 is a block diagram of an example network device to assign a subset of access points in a wireless network to a high priority.

The at least one processor 310 may fetch, decode, and execute instructions stored on storage medium 320 to perform the functionalities described below in relation to instructions 330-380. In other examples, the functionalities of any of the instructions of storage medium 320 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 3, storage medium 320 may be implemented by one machine-readable storage medium, or multiple machine-readable storage media.

Although network device 300 includes at least one processor 310 and machine-readable storage medium 320, it may also include other suitable components, such as additional processing component(s) processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 330-380 may be executed by processor 310 to: determine locations of a plurality of client devices within a wireless network; assign the plurality of client devices into a number of clusters; calculate an original cluster centroid location for each cluster of client devices; calculate an average distance between each client device in a particular cluster and the original cluster centroid location for the particular cluster; iteratively adjust the number of clusters and assignment of the plurality of client devices to determine the number of clusters associated with a low number of clusters and a low average distance from each client device in a respective cluster to a respective cluster centroid location; assign a subset of access points in the wireless network to a high priority, each AP in the subset having the closest distance to the respective cluster centroid location corresponding to the determined number of clusters; assign each client device in the plurality of client devices to a cluster whose cluster centroid location is closest to the location of the each client device; iteratively adjust the number of clusters and the assignment of the plurality of client devices using K-means clustering; etc.

Moreover, instructions 330-380 can be executed by processor 310 further to: randomly select a subset of client devices from the plurality of client devices, wherein a total number of selected client devices equals to the number of clusters; associate each of remaining client devices to one client device in the subset that is closest in distance to each respective remaining client device; for each client device in the selected subset, identify associated remaining client devices as belonging to the same cluster of client devices; give each client device in the plurality of client devices a weight value based on a client parameter; select the respective client device frequently into the subset of client devices in response to a respective client device having a high weight value; determine a closest cluster centroid location for each of the plurality of client devices; associate each respective client device to a new cluster whose centroid location has closest distance to the each respective client device; calculate a new cluster centroid location based on client devices associated to the new cluster; determine whether a distance between a respective new cluster centroid location and original cluster centroid location is less than a predetermined threshold; assign the high priority to the subset of access points having closest distance to each new cluster centroid location in response to a distance between a respective new cluster centroid location and original cluster centroid location being less than a predetermined threshold; etc.

We claim:

1. A method comprising:
    assigning, by a network device, a plurality of client devices in a wireless network into a number of clusters;
    calculating, by the network device, a cluster centroid for each cluster of client devices based on locations of the client devices;
    calculating, by the network device, an average distance between each client device in a particular cluster and the original cluster centroid location for the particular cluster;
    determining, by the network device, that the number of clusters is associated with a low average distance from each client device in a respective cluster to a respective cluster centroid;
    including, by the network device, an access point located closest to the respective cluster centroid in a subset of access points in the wireless network; and
    assigning, by the network device, the subset of access points in the wireless network to a high priority.

2. The method of claim 1, further comprising:
    assigning, by the network device, each client device in the plurality of client devices to a cluster whose cluster centroid location is closest to the location of the each client device.

3. The method of claim 1, further comprising:
    determining, by a network device, locations of a plurality of client devices within the wireless network;
    assigning, by the network device, the plurality of client devices into the clusters; and
    iteratively adjusting, by the network device, the number of clusters and assignment of the plurality of client devices to determine a low number of cluster and a low average distance from each client device in a respective cluster to a respective cluster centroid location; and calculating, by the network device, an original cluster centroid location for each cluster of client devices.

4. The method of claim 3, wherein iteratively adjusting the number of clusters and assignment of the plurality of client devices further comprises:

iteratively adjusting, by the network device, the number of clusters and the assignment of the plurality of client devices using K-means clustering.

5. The method of claim 1, wherein assigning the plurality of client devices in the wireless network into the clusters further comprising:

randomly selecting a subset of client devices from the plurality of client devices, wherein a total number of selected client devices equals to the number of clusters;

associating each of remaining client devices to one client device in the subset that is closest in distance to each respective remaining client device; and for each client device in the selected subset, identifying associated remaining client devices as belonging to the same cluster of client devices.

6. The method of claim 5, further comprising:

giving each client device in the plurality of client devices a weight value based on a client parameter; and in response to a respective client device having a high weight value, selecting the respective client device frequently into the subset of client devices.

7. The method of claim 6, further comprising:

determining a closest cluster centroid location for each of the plurality of client devices;

associating each respective client device to a new cluster whose centroid location has closest distance to the each respective client device; and calculating a new cluster centroid location based on client devices associated to the new cluster.

8. The method of claim 7, further comprising:

determining whether a distance between a respective new cluster centroid location and original cluster centroid location is less than a predetermined threshold; and in response to a distance between a respective new cluster centroid location and original cluster centroid location being less than a predetermined threshold, assigning the high priority to the subset of access points having closest distance to each new cluster centroid location.

9. The method of claim 1, wherein the subset of access points are (1) associated with a high priority traffic profile, (2) associated with a high priority Quality-of-Service (QoS) profile, and (3) given priority for selecting their operating channels.

10. A network device, comprising at least:

a memory;

a processor executing instructions from the memory to:

assign a plurality of client devices in a wireless network into a number of clusters;

calculate a cluster centroid for each cluster of client devices based on locations of the client devices;

calculate an average distance between each client device in a particular cluster and the original cluster centroid location for the particular cluster;

determine that the number of clusters is associated with a low average distance from each client device in a respective cluster to a respective cluster centroid;

include an access point located closest to the respective cluster centroid in a subset of access points in the wireless network; and assign the subset of access points in the wireless network to a high priority.

11. The network device of claim 10, wherein the processor further executes the instructions from the memory to:

assign each client device in the plurality of client devices to a cluster whose cluster centroid location is closest to the location of the each client device.

12. The network device of claim 10, wherein the processor further executes the instructions from the memory to:

determine locations of a plurality of client devices within the wireless network;

assign the plurality of client devices into the clusters; and iteratively adjust the number of clusters and assignment of the plurality of client devices to determine a low number of cluster and a low average distance from each client device in a respective cluster to a respective cluster centroid location; and calculate an original cluster centroid location for each cluster of client devices.

13. The network device of claim 12, wherein the processor further executes the instructions from the memory to:

iteratively adjust the number of clusters and the assignment of the plurality of client devices using K-means clustering.

14. The method of claim 10, wherein the processor further executes the instructions from the memory to:

randomly select a subset of client devices from the plurality of client devices, wherein a total number of selected client devices equals to the number of clusters;

associate each of remaining client devices to one client device in the subset that is closest in distance to each respective remaining client device; and for each client device in the selected subset, identify associated remaining client devices as belonging to the same cluster of client devices.

15. The network device of claim 14, wherein the processor further executes the instructions from the memory to:

give each client device in the plurality of client devices a weight value based on a client parameter; and in response to a respective client device having a high weight value, select the respective client device frequently into the subset of client devices.

16. The network device of claim 15, wherein the processor further executes the instructions from the memory to:

determine a closest cluster centroid location for each of the plurality of client devices;

associate each respective client device to a new cluster whose centroid location has closest distance to the each respective client device; and calculate a new cluster centroid location based on client devices associated to the new cluster.

17. The network device of claim 16, wherein the processor further executes the instructions from the memory to:

determine whether a distance between a respective new cluster centroid location and original cluster centroid location is less than a predetermined threshold; and in response to a distance between a respective new cluster centroid location and original cluster centroid location being less than a predetermined threshold, assign the high priority to the subset of access points having closest distance to each new cluster centroid location.

18. The network device of claim 10, wherein the subset of access points are (1) associated with a high priority traffic profile, (2) associated with a high priority Quality-of-Service (QoS) profile, and (3) given priority for selecting their operating channels.

19. A non-transitory machine-readable storage medium encoded with instructions executable by at least one processor of a network device, the machine-readable storage medium comprising instructions to:
  assign a plurality of client devices in a wireless network into a number of clusters;
  calculate a cluster centroid for each cluster of client devices based on locations of the client devices;
  calculate an average distance between each client device in a particular cluster and the original cluster centroid location for the particular cluster;
  determine that the number of clusters is associated with a low average distance from each client device in a respective cluster to a respective cluster centroid;
  include an access point located closest to the respective cluster centroid in a subset of access points in the wireless network; and
  assign the subset of access points in the wireless network to a high priority.

20. The non-transitory machine-readable storage medium of claim 19, wherein the machine-readable storage medium further comprises instructions to:
  determine locations of a plurality of client devices within the wireless network;
  assign the plurality of client devices into the clusters; and
  iteratively adjust the number of clusters and assignment of the plurality of client devices to determine a low number of cluster and a low average distance from each client device in a respective cluster to a respective cluster centroid location; and
  calculate an original cluster centroid location for each cluster of client devices;
  determine a closest cluster centroid location for each of the plurality of client devices;
  assign each respective client device to a new cluster whose centroid location has closest distance to the each respective client device;
  calculate a new cluster centroid location based on client devices associated to the new cluster;
  determine whether a distance between a respective new cluster centroid location and original cluster centroid location is less than a predetermined threshold; and
  in response to a distance between a respective new cluster centroid location and original cluster centroid location being less than a predetermined threshold, assign the high priority to the subset of access points having closest distance to each new cluster centroid location.

* * * * *